Patented Oct. 8, 1940

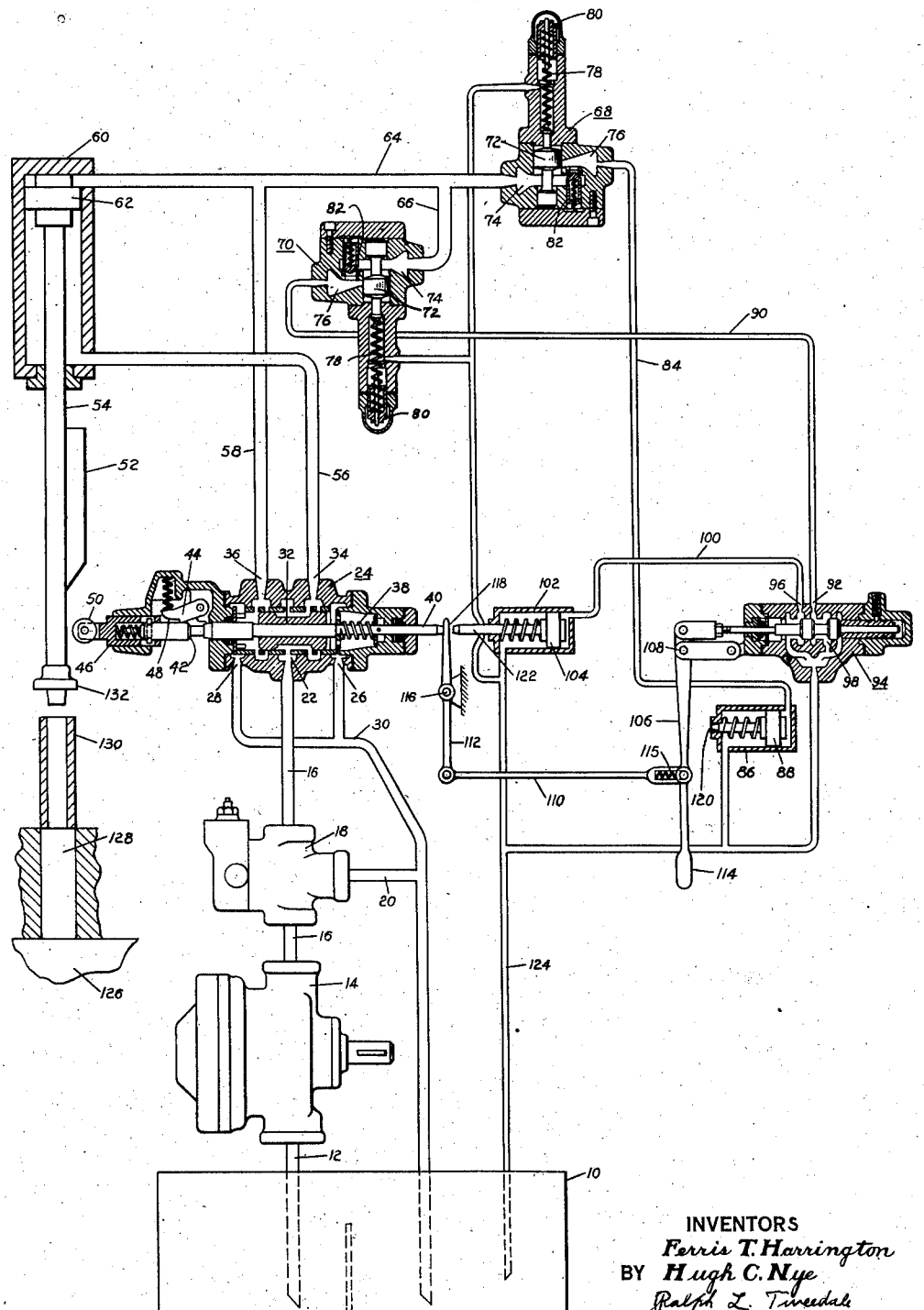

2,216,973

UNITED STATES PATENT OFFICE 2,216,973

BUSHING ASSEMBLY PRESS

Ferris T. Harrington and Hugh C. Nye, Detroit, Mich., assignors to Vickers Incorporated, Detroit, Mich., a corporation of Michigan Application December 1, 1937, Serial No. 177,401

5 Claims. (Cl. 60—52)

This invention relates to power transmission systems of the type wherein a liquid medium, hereinafter referred to as oil, is utilized for transmitting power between a pump and a fluid motor. The object of the present invention is to provide a power transmission system wherein the force or resistance encountered by the fluid may be utilized to cause a change in the manner of operation of the system.

One application to which the present invention is particularly suited is the operation of a hydraulic press for assembling bushings in holes where it is necessary that each bushing fit the hole with proper tightness, that is, the bushing when entering in the hole should neither be too tight or too loose and the force required to press the bushing into the hole is the measure of the fit between the bushing and the hole.

It is accordingly a further object of the present invention to provide a power transmission system particularly adapted for operating a press of this character and wherein means are incorporated for preventing operating of the press whenever the resistance encountered to force a bushing into a hole is either too low or too high.

Further objects and advantages of the present invention will be apparent from the following description, reference being had to the accompanying drawing wherein a preferred form of the present invention is clearly shown.

In the drawing: the single figure illustrates diagrammatically a press incorporating a preferred form of the present invention.

A sump 10 contains a supply of oil which is withdrawn through suction pipe 12 by a pump 14 of any suitable construction and which is driven by an electric motor or other prime mover not shown. Pump 14 delivers oil through a delivery conduit 16 in which is incorporated a relief valve 18 of conventional form adapted to by-pass oil to the sump through a conduit 20 whenever a predetermined safe pressure is exceeded. The delivery conduit 16 is connected to a port 22 of a four-way valve 24. The valve 24 is provided with return ports 26 and 28 which are connected by a conduit 30, with the sump 10. A spool 32 is adapted to selectively connect a pair of ports 34 and 36 with the ports 22 and 26—28 alternately, in the well known manner, when moved to the right or to the left. The spool 32 is biased to its right hand position by a spring 38 and may be operated by a stem 40. Stem 40 projects through the left end of the valve casing and has a shoulder 42 formed thereon which may be engaged by a spring pressed detent 44. A sleeve 46 surrounds the stem 40 and is adapted to co-act with a cam surface 48 formed on the detent 44 whereby when the sleeve 46 is moved to the right the detent 44 is lifted out of engagement with the shoulder 42, a roller 50 is carried by the sleeve 46 whereby the latter may be actuated by a cam 52 mounted on the rod 54 later to be described. The ports 34 and 36 are connected by conduits 56 and 58 with the lower and upper ends respectively of a fluid motor cylinder 60. Slidably mounted within a cylinder 60 is a piston 62 to which the piston rod 54 is attached and which may form the ram of the press.

Communicating with the conduit 58 by branch conduits 64 and 66 are a pair of pressure responsive by-pass valves 68 and 70 which may be of similar construction. Each valve encloses a spool 72 adapted to normally close communication between ports 74 and 76. That portion of the spool adjacent to port 76 is slightly larger in diameter than the other portion of the spool so that there is a differential area subjected to the pressure within port 74 tending to opening the valve. A compression spring 78 biases the spool 72 to closed position and may be adjusted by an adjusting screw 80. A check valve 82 is provided between the ports 74 and 76 opening in the direction of flow from the port 76 to the port 74. The port 76 of valve 68 is connected by a conduit 84 to a cylinder 86 having a spring biased piston 88 therein. The port 76 of the valve 70 is connected by a conduit 90 to a port 92 of a three-way valve 94.

The valve 94 has two operative positions, the right hand one of which is shown on the drawing, in which the port 92 is connected to a port 98. When the valve spool is moved to the left the port 92 is connected to a port 96. Port 96 is connected with a conduit 100 leading to a cylinder 102 in which a spring biased piston 104 is slidably mounted.

The spool valve 94 is connected with an operating lever 106 fulcrumed at 108. The opposite end of the lever 106 is connected by a link 110 to a lever 112 and has a handle 114. Lost motion with spring take-up is provided between lever 106 and link 110 at the slot 115. Lever 112 is fulcrumed at 116 and has an end 118 adapted to engage the stem 40 of the valve 14. A stem 120 of the piston 88 is adapted to abut the lever 106 and move the same fully to the left whenever fluid pressure is admitted to the cylinder 86. A stem 122 of the piston 104 is adapted to abut the lever 118 and hold the same in its left most position whenever fluid is admitted to the cylinder 102. A drain conduit 124 connects to the port 98 of the valve 94, to the stem ends of the cylinders 86 and 102 and to the drain chambers of the valves 68 and 70.

In operation the pump 14 is placed in operation withdrawing fluid from the sump 10 through conduit 12 and delivering the same to conduit 16. In the normal or stop position of the lever 114, the spool 32 is in right hand position as is also the spool of valve 94. Pressure is accordingly maintained beneath piston 62 and excess fluid is by-passed from conduit 16 to the conduit 30 through relief valve 18. When it is desired to start the piston 66 downwardly to force a bushing into a hole the lever 114 is moved to the right moving lever 118 and stem 40 to the left. Pressure oil is accordingly admitted from port 22 to port 36 and pipe 58 where it enters the upper end of cylinder 60 forcing piston 62 downwardly. As soon as the stem 40 is moved fully to the left the detent 44 engages the shoulder 42 preventing return movement of the spool 32 under the urge of spring 38. A portion of the press bed is indicated at 126 upon which a work piece having a hole 128 rests. A bushing 130 is adapted to be pressed into the hole 128 by the nose-piece 132 on the press ram 54. As the piston 62 descends the cam 52 engages roller 50 very shortly after the bushing first enters the hole and the sleeve 46 is caused to move to the right, releasing detent 44 from shoulder 42. The valve spool 32 is accordingly released to move to the right unless fluid pressure has been previously admitted to the cylinder 102 and caused the stem 122 to abut against the lever 118 and the stem 40.

The valves 68, 70 and 94 together determine whether or not the stem 122 will be projected to the left. The valve 70 is adjusted to open at a pressure in the conduit 66 which is equal to the pressure developed in cylinder 60, when the least permissible resistance is encountered when the bushing enters the hole. Valve 68 is adjusted to open at a higher pressure and which is the pressure existing in the cylinder 60 when the maximum permissible resistance is encountered as bushing enters the hole. If the resistance encountered is within the permissible range valve 70 will open and valve 68 will not open. Fluid will accordingly be admitted to the conduit 90 and since handle 114 has been moved to the right carrying the spool of the valve 94 to the left fluid will enter through ports 92 and 96 and conduit 100 to the cylinder 102. The piston 104 will thus be moved to the left and exert sufficient force on the stem 40 to retain the spool 32 in its leftward position against the force of spring 38 even though the latch 44 be released. The piston 62 will accordingly continue downwardly until the end of its stroke is reached at which time pressure will remain on the top of piston 62 until the handle 114 is manually moved to the left against the spring in slot 115. When this is done the cylinder 102 is vented permitting piston 104, valve spool 32 and the control lever 118 to move to the right causing pressure fluid to be admitted to the pipe 56 and to the underside of piston 62, causing the latter to return.

Should the resistance encountered as the bushing enters the hole be lower than the minimum determined by the setting of valve 70 the latter will not open and stem 122 will accordingly remain retracted. Then as soon as the cam 52 contacts the roller 50 the detent 44 is released and spool 42 is permitted to move to the right under its spring bias, thus causing the piston 62 to return without completing its stroke and giving an indication that the particular bushing in the press is an unsatisfactory fit. Should the resistance encountered as a bushing enters the hole be too high both the valves 68 and 70 will be open admitting fluid to conduits 84 and 90 simultaneously. Fluid in conduit 84 enters the cylinder 86 projecting the stem 120 to the left and shifting the lever 106 to the left. The stem of valve 94 is accordingly shifted to the right connecting port 92 with the drain port 98 and venting the cylinder 102. The cam 52 accordingly trips the detent 44 in the manner previously described and causes the return of piston 62 without completing its stroke, thus likewise indicating an unsatisfactory fit.

While the form of embodiment of the invention as herein disclosed, constitutes a preferred form, it is to be understood that other forms might be adopted, all coming within the scope of the claims which follow.

What is claimed is as follows:

1. A fluid power transmission system comprising in combination a fluid motor, pump means for supplying fluid to the motor to operate the motor in either direction, overload pressure limiting means for the pump, means for controlling the direction of fluid flow to the motor, manual means for operating the control means, a member movable only upon the meeting of maximum resistance, a second member movable whenever minimum resistance is encountered, and means responsive either to movement of the first member or to non-movement of the second member for causing an indication of resistance above or below said maximum or minimum resistances to be given.

2. A fluid power transmission system comprising in combination a fluid motor, pump means for supplying fluid to the motor to operate the motor in either direction, means for controlling the direction of fluid flow to the motor, manual means for operating the control means and means for operating said control means independently of the manual means to reverse the motor when the resistance encountered thereby falls either above or below a predetermined range, said last means including a member movable only upon the meeting of excessive resistance, a second member movable whenever normal or higher resistance is encountered, and means responsive either to movement of the first member, or to non-movement of the second member for causing said control means to reverse the motor.

3. A fluid power transmission system comprising in combination a fluid motor, pump means for supplying fluid to the motor to operate the motor in either direction, means for controlling the direction of fluid flow to the motor, manual means for operating the control means and means for operating said control means independently of the manual means to reverse the motor when the resistance encountered thereby falls either above or below a predetermined range, said last means including a member movable only upon the development of a predetermined high fluid pressure at the motor, a second member movable upon the development of a predetermined lower pressure at the motor, and means responsive either to movement of the first member or to non-movement of the second member for operating said control means to reverse the motor.

4. A fluid power transmission system comprising in combination a fluid motor, pump means for supplying fluid to the motor to operate the motor in either direction, means for controlling the direction of fluid flow to the motor, manual means for operating the control means and means including a detent for restraining said control means when it has been manually operated, means operated by the motor for releasing said detent after the motor starts to move, and additional pressure responsive means for restraining said control means when the detent has been released and whenever a predetermined resistance is encountered.

5. A fluid power transmission system comprising in combination a fluid motor, pump means for supplying fluid to the motor to operate the motor in either direction, means for controlling the direction of fluid flow to the motor, manual means for operating the control means and means including a detent for restraining said control means when it has been manually operated, means operated by the motor for releasing said detent after the motor starts to move, and additional pressure responsive means for restraining said control means when the detent has been released and whenever a predetermined resistance is encountered, and means rendered effective when a predetermined higher resistance is encountered for disabling said additional pressure responsive means.

FERRIS T. HARRINGTON.
HUGH C. NYE.